United States Patent

[11] 3,532,190

| [72] | Inventor | John S. Palmer<br>Clarendon Hills, Illinois |
|---|---|---|
| [21] | Appl. No. | 767,201 |
| [22] | Filed | Oct. 14, 1968 |
| [45] | Patented | Oct. 6, 1970 |
| [73] | Assignee | International Harvester Company<br>Chicago, Illinois<br>a corporation of Delaware |

[54] AUTOMATIC ADJUSTOR FOR DISC BRAKES
8 Claims, 4 Drawing Figs.

[52] U.S. Cl. .................................................... 188/72,
188/196
[51] Int. Cl. ..................................................... F16d 55/15,
F16d 65/54
[50] Field of Search ........................................ 188/72—73C,
79.5(m), 196(P)

[56] References Cited
UNITED STATES PATENTS

| 2,384,297 | 9/1945 | Goepfrich | 188/196(P)UX |
| 3,322,238 | 5/1967 | Bauman | 188/196(P)UX |
| 3,403,754 | 10/1968 | Barret et al. | 188/196(P)UX |

*Primary Examiner*—Duane A. Reger
*Attorney*—Noel G. Artman

ABSTRACT: A disc brake assembly including a self-adjusting friction lining wear compensating means for automatically adjusting the running clearance between the pressure plate and the rotatable friction members wherein the wear compensating means is completely located within the stationary housing portion of the brake assembly.

Patented Oct. 6, 1970     3,532,190
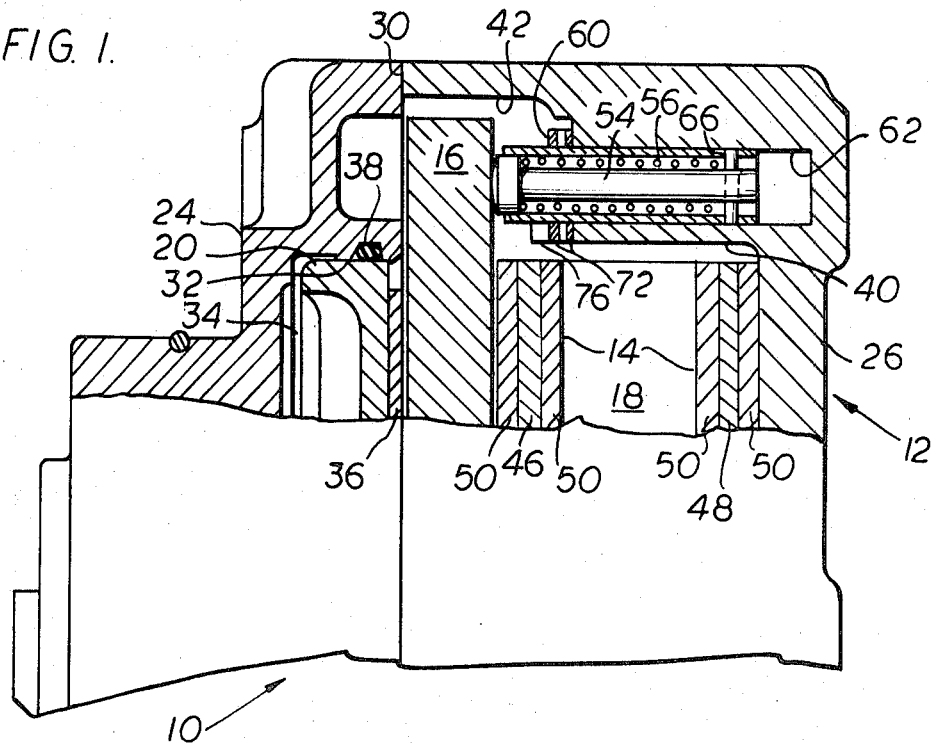
FIG. 1.
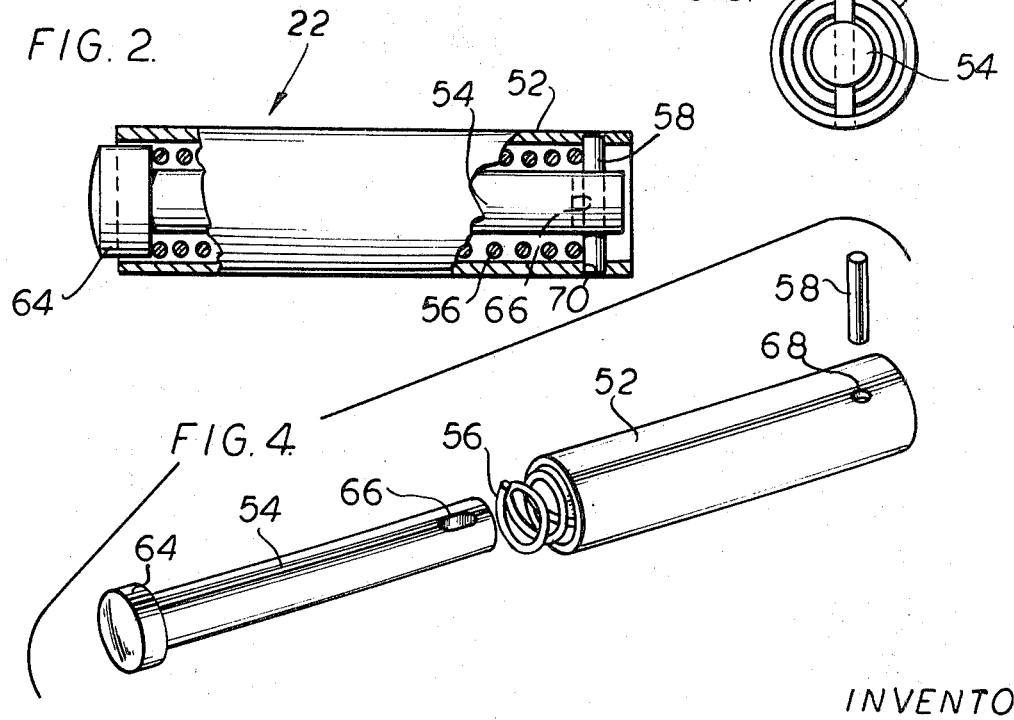
FIG. 2.
FIG. 3.
FIG. 4.
INVENTOR
JOHN S. PALMER
Ronald C. Kamp
ATT'Y 3,532,190

AUTOMATIC ADJUSTOR FOR DISC BRAKES

This invention relates to friction engaging devices such as clutches and brakes and more particularly to self adjusting means necessary to adjust for wear of the friction members.

It is a desirable feature in clutches and brakes to maintain a minimum running clearance between the friction surfaces. This is especially true in fluid pressure actuated devices so that the displacement of the pressure actuated piston necessary to cause engagement is held to a minimum. While some devices have been developed to deal with this problem, they have suffered from a variety of deficiencies. In some cases they have been over-complicated and consequently costly to produce and difficult to maintain. In some instances, the adjusting means has been put out of adjustment during disassembly of the unit for repair or replacement of parts.

Accordingly, it is an object of this invention to provide an automatic self adjusting unit to compensate for wear of the friction members and maintain a predetermined running clearance.

Another object is to provide a self adjusting unit which is of simple construction and easy to install in a friction engaging device.

Another object is to provide an automatic self adjusting unit which will not be subject to misadjustment when the friction engaging device with which it is associated is dismantled for repair.

Summarizing briefly, the invention herein provides a self adjusting unit for maintaining a predetermined running clearance between the friction members. This self adjusting unit is disposed in the stationary housing of the disc brake device. A spring actuated plunger contacts the pressure plate and upon disengagement of the brake device this plunger urges the pressure plate to a position out of engagement with the friction members only far enough to permit a running clearance. As the friction members wear the self adjusting unit is moved within the housing to an adjusted position so that upon disengagement of the brake the pressure plate always is urged to a position to maintain the same amount of clearance thus compensating for the wear of the friction members.

The above and other objects and advantages of the invention will be more readily apparent when read in conjunction with the drawings in which:

FIG. 1 is a partial elevation view partially in section embodying the principles of the invention;

FIG. 2 is a broken away section of the adjusting unit;

FIG. 3 is an end view of FIG. 2; and

FIG. 4 is an exploded view in perspective showing parts of the adjusting unit.

Referring now to the drawings wherein like reference characters in the several views designate like parts the numeral 10 designates generally a disc brake unit. This unit includes a stationary housing 12, rotatable friction means 14, a primary pressure plate 16, a secondary pressure plate 18, an actuating piston 20 and a self adjusting wear compensating unit 22. The housing 12 is formed of two generally annular sections, a stationary piston housing 24 and a stationary brake housing 26 secured together at their peripheries by suitable means such as pins or bolts (not shown) along a line 30.

The piston housing 24 is formed with a bore 32 in which the annular piston member 20 is disposed for axial movement therein. The piston member is adapted to be actuated by fluid pressure acting thereon through pressure chamber or cavity 34 in communication with the rear of the piston. The front face of piston 20 is lined with an insulating member 36 to prevent transfer of heat from the braking unit to the hydraulic pressure fluid. Adequate sealing means such as an O-ring seal 38 is provided between the bore 32 and piston 20 to prevent fluid pressure leakage into the braking unit.

The stationary brake housing 26 is formed with two axially extending bores 40 and 42, separated by annular shoulder 44 for accommodating the rotatable friction means 14 and the primary and secondary pressure plates 16 and 18.

The friction means 14 includes a pair of annular friction discs 46 and 48 mounted on a shaft (not shown) which may be rotatably journaled in the housing 12 by conventional means. Each of the friction discs may have friction linings 50 disposed on both sides thereof. It is these friction linings which are subject to wear and require a wear compensating means such as unit 22.

Secondary pressure plate 18 is an annular member of approximately the same size as the friction discs and is disposed between them. This pressure plate 18 is non-rotatable but is axially movable in response to the movement of actuating piston 20.

The primary pressure plate 16 also is an annular non-rotatable member which is axially movable to the right as viewed in FIG. 1 in response to the movement of actuating piston 20 to effect engagement of the brake. The pressure plate 16 extends radially beyond the friction members and the secondary pressure for a purpose which will become more evident.

At least one and preferrably a plurality of self adjusting wear compensating units 22 are utilized in the disc brake unit 10. The units 22 are loosely disposed in bores formed in the shoulder 44 of the stationary brake housing 26 with their axes generally parallel to the axis of rotation of the friction discs. Each unit 22 comprises a brake adjustor tube 52, a brake adjustor plunger 54, a brake piston return spring 56, a spring retaining pin 58 and friction means 60. The tube 52 is slidably disposed in a bore 62 in the brake housing 26. The plunger 54 has an enlarged head 64 formed at one end thereof which in the assembly bears against the face of the pressure plate 16. The other end of the plunger 54 has a diametrically extending hole 66 therethrough through which pin 58 extends. The ends of the pin 58 are secured in diametrically opposed holes 68 and 70 in the tube 52. As is apparent the spring 56 is confined between head 64 and pin 58. The spring is designed to exert a certain pressure against head 64. It has been found in one type of braking unit, for example, that a spring force of approximately 40 lbs. is appropriate. The hole 66 is slightly larger in diameter than the diameter of the pin 58 to allow a small amount of relative movement of the pin in the hole 66 axially along the longitudinal axis of the plunger. In one embodiment, for example, the diameter of the hole is only .025" larger than the diameter of the pin, thus allowing only .025" of relative movement between the pin and plunger. It will be apparent from FIG. 2 that based on the above, the plunger 54 can move a distance relative to the tube 52 equal to the difference in size between the pin 58 and hole 64. The difference is exaggerated in FIG. 2 for clarity.

The friction means 60 may comprise one or a plurality of friction rings 72 frictionally engaged on the tube 52, three rings being used in this instance. The rings 72 are held in place against axial movement to the right, and this may be accomplished as shown in FIG. 1 by having them abut against the surface 74 of shoulder 44. It will be apparent from FIG. 1 that the tube 52 carrying the plunger 54 therein can be moved further into bore 62, but this is done against the frictional resistance supplied by the friction rings 72. The frictional force exerted by friction means 60, of course, is greater than the force exerted by spring 56. This is necessary so that pressure on the plunger 54 by pressure plate 16 will compress spring 56 before any movement of tube 52 is allowed.

One or more projections or abutments 76 may be connected to the stationary brake housing to form a limit stop for the pressure plate to define the absolute limit beyond which the pressure plate cannot move. In this case they are formed integral with the stationary brake housing 26 and project axially therefrom. When the friction linings have worn to a point where they should be replaced, plate 16 will but up against abutment 76.

As previously noted, a plurality of units 22 can be used. One successful brake unit, for example, has been made using four units in clusters of two, diametrically opposite in order to equalize the forces acting to return the piston 20.

To summarize briefly, the operation of the unit is as follows. When the brake pedal of the vehicle in which the brake unit is disposed is depressed, hydraulic fluid under pressure is pumped into pressure chamber or cavity 34. The fluid pressure moves actuating piston 20 and insulating member 36 to the right against pressure plate 16 to squeeze the friction discs 46 and 48 and pressure plate 18 against the stationary housing 26. As the pressure plate 16 moves to the right, it presses against the plunger 54 in each of the units 22. As can be clearly observed from FIG. 2, this will tend to compress the spring 56 but only up to a maximum amount of .025" or whatever other clearance is designed into the unit. At this point, engagement should have been effected. If it has not, then the pressure plate 16 will continue to move the plunger 54 to the right, but the axial movement of the plunger relative to the tube 52 is now restrained. Any further movement of the plunger to the right will carry with it the tube 52, this movement of the tube 52 being against the frictional drag of friction rings 72. When the brake pedal is released reducing the hydraulic pressure in cavity 34 and against piston 20, the piston return spring 56 in each of the units urge the plungers 54 to the left a distance of only .025" relative to the tube 52. The tube 52 does not move back to the left to its original position. This movement of the plunger 54 urges the pressure plate .025" to the left to provide a running clearance between the rotatable and stationary members of the brake unit. Thus, however for the tube 52 is moved to the right during engagement of the brake, the return springs will only move the plunger 54 and pressure plate 16 back a predetermined distance such as the .025" which has been described herein. Thus, whatever the wear on the friction linings a predetermined running clearance between the rotating and stationary members can be maintained.

This invention advantageously provides a simple self adjusting wear compensating means. The units 22 are uncomplicated and simple to manufacture. The units 22 are pre-assembled and then merely dropped into place in the bores 62. Positioning these units completely in the stationary housing is particularly advantageous in that manufacturing difficulties are reduced because no complicated connections are required with other parts such as the pressure plate, for example. In dismantling of the brake unit, it is unnecessary to touch the adjustment of the wear compensating units.

While the self adjusting units have been described herein in connection with a brake device, they could also be used with clutch devices.

While a preferred embodiment of the invention has been specifically disclosed, it is to be understood that the invention is not limited thereto as other variations will be apparent to those skilled in the art and the invention is to be given its fullest possible interpretation within the terms of the following claims.

I claim:
1. In a disc brake the combination comprising:
a stationary housing;
non-rotating axially movable pressure plate means in said housing;
actuating means for axially moving said pressure plate means;
rotatable friction member means disposed between said pressure plate means and said housing and adapted to be moved in an axial direction in response to said pressure plate actuating means; and
self adjusting wear compensating means disposed in said brake housing, said self adjusting means comprising:
an adjustor tube slidably disposed in a bore in said housing;
a plunger disposed in said tube, having one end thereof bearing against said pressure plate means;
means interconnecting said plunger and tube to permit said plunger to move relative to said tube a predetermined limited amount;
spring biasing means for urging said plunger to a predetermined position with respect to said tube; and
friction drag means associated with said tube for controlling the position of said tube in said bore.

2. The combination of claim 1 wherein said interconnecting means serves as a spring retaining member.

3. The combination of claim 1 wherein said interconnecting means includes plunger restraining means supported on said tube and said plunger restraining means is a reaction member for said spring biasing means.

4. The combination of claim 1 wherein:
said interconnecting means includes pin member supported by said tube in a transversely extending relation thereto; and
said plunger includes a transversely extending opening for receiving said pin member therethrough to allow a small amount of longitudinal movement of said plunger with respect to said tube.

5. The combination of claim 1 including abutment means on said housing for limiting the axial movement of said pressure plate means.

6. The combination of claim 1 wherein said frictional drag means comprises disc means frictionally engaging said adjustor tube and abutting said brake housing.

7. A unitary self adjusting wear compensating device for use in friction engaging devices comprising:
an adjustor tube adapted to be slidably disposed in a retaining bore in the friction engaging device;
an adjustor plunger slidably disposed in said tube and having spring retainer means connected to one end thereof;
means interconnecting the other end of said tube and plunger in a manner to permit only limited relative axial movement between the tube and plunger; and
compression spring means disposed between said interconnecting means and said spring retainer means.

8. The device of claim 7 including adjusting means frictionally engaging said adjustor tube, said adjusting means being adapted to cooperate with the friction engaging device to adjustably position said adjustor tube in the latter.